G. KAMMERER.
TOOL FOR CUTTING AND REMOVING PIPE FROM WELLS.
APPLICATION FILED JAN. 23, 1918.
1,277,600.
Patented Sept. 3, 1918.
2 SHEETS—SHEET 1.
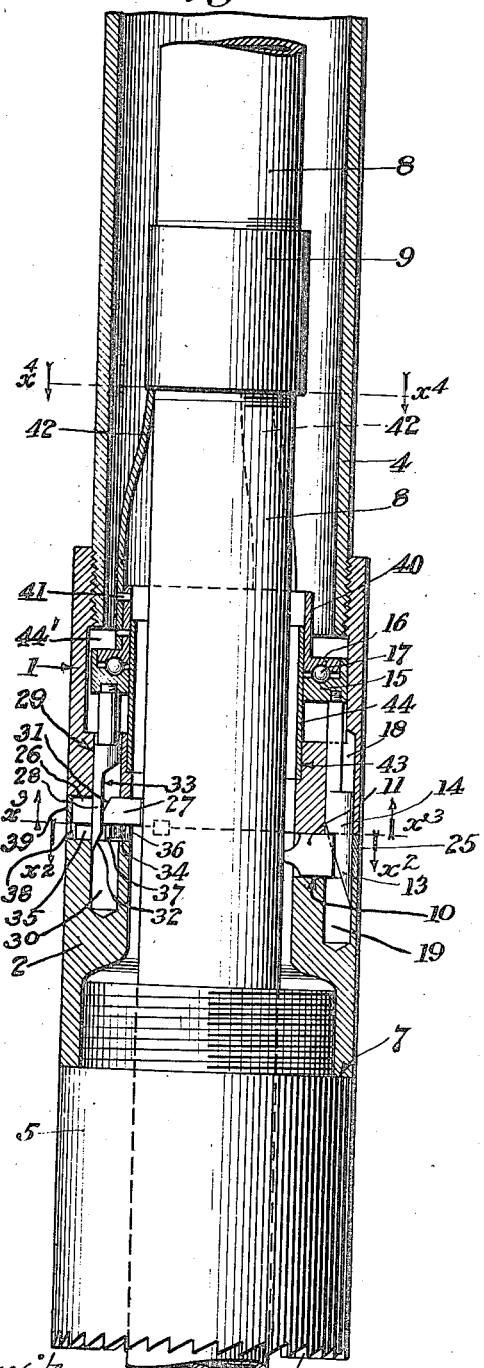
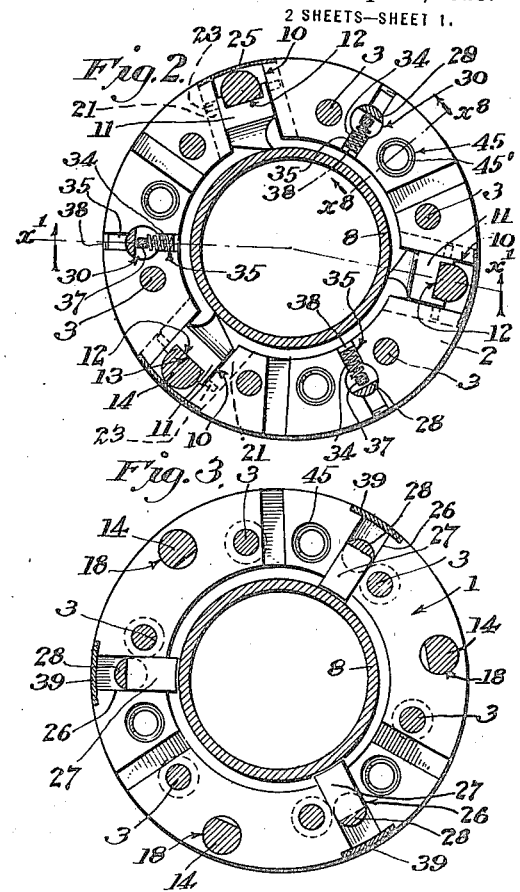
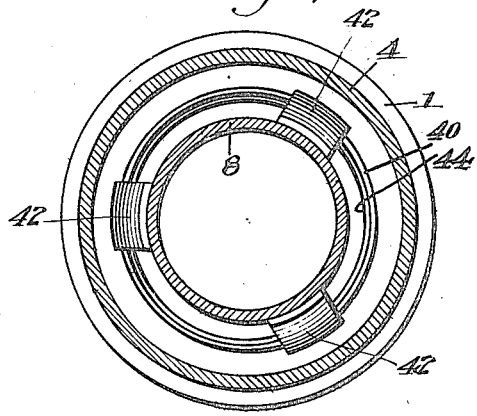
Witnesses:
Inventor:
George Kammerer,
By Frederick P. Phypers
Attorneys G. KAMMERER.
TOOL FOR CUTTING AND REMOVING PIPE FROM WELLS.
APPLICATION FILED JAN. 23, 1918.
1,277,600.
Patented Sept. 3, 1918.
2 SHEETS—SHEET 2.
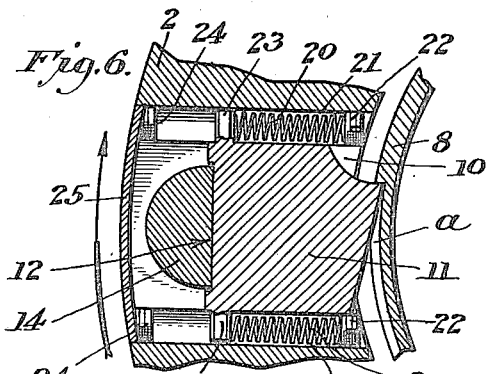
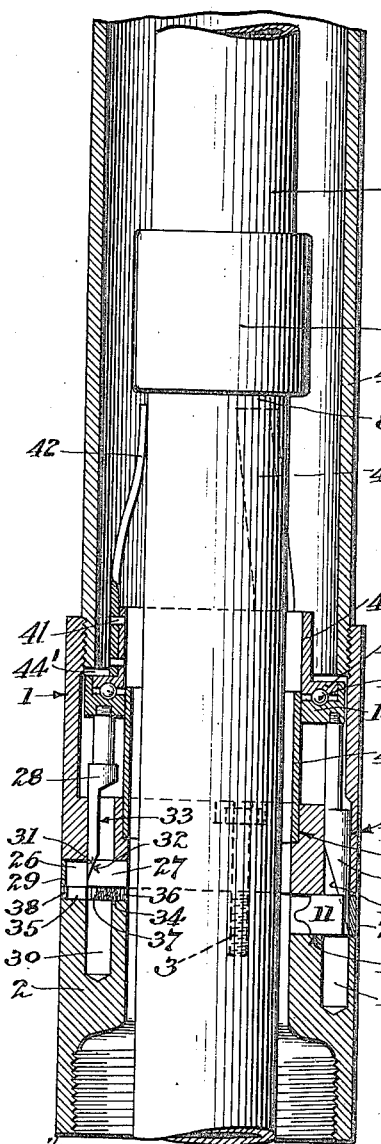
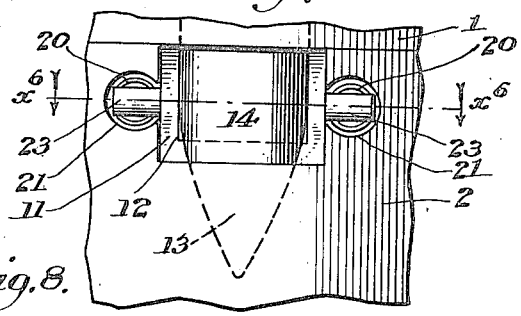
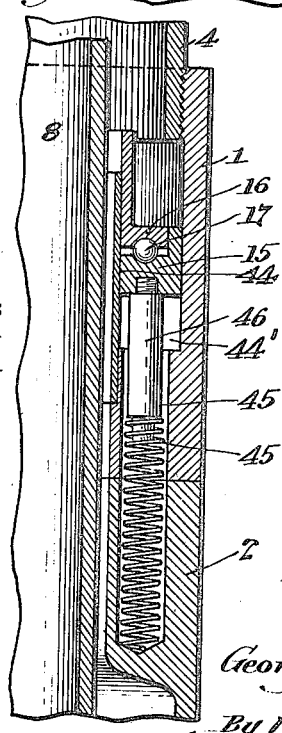
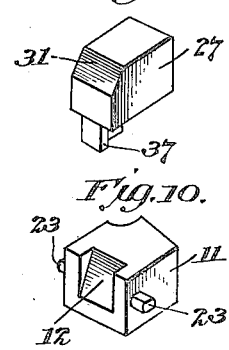
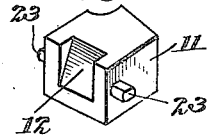
Inventor:
George Kammerer,
By Frederick P. Pryor,
Attorney
Witnesses:

UNITED STATES PATENT OFFICE.

GEORGE KAMMERER, OF TAFT, CALIFORNIA.

TOOL FOR CUTTING AND REMOVING PIPE FROM WELLS.

1,277,600.

Specification of Letters Patent.

Patented Sept. 3, 1918.

Application filed January 23, 1918. Serial No. 213,296.

*To all whom it may concern:*

Be it known that I, GEORGE KAMMERER, a citizen of the United States, residing at Taft, in the county of Kern and State of California, have invented a new and useful Tool for Cutting and Removing Pipe from Wells, of which the following is a specification.

This invention relates to tools for cutting pipe from the outside thereof and is especially of use in the cutting and removing of drill stems of the type employed in sinking wells.

An object of this invention is to provide a tool of this character which will sever a portion of the drill stem from another portion and which will operate to raise the severed portion from the well. This is desirable in cleaning out a well being drilled when the drilling tools become inoperative for any reason whatsoever.

Another object is to provide a device of this character of comparatively simple construction and one which is not liable to get out of order.

Another object is to make provision in the tool for cutting away obstructions from adjacent the drill stem being operated on.

Other objects and advantages will appear from the subjoined detail description.

The accompanying drawings illustrate the invention:

Figure 1 is an elevation mainly in vertical mid-section on line $x^1$—$x^1$, Fig. 2, of a tool embodying the invention, said tool being shown in position on a drill stem ready for the cutting operation.

Fig. 2 is a sectional plan view on line indicated by $x^2$—$x^2$, Fig. 1.

Fig. 3 is an inverted plan section on line indicated by $x^3$—$x^3$, Fig. 1.

Fig. 4 is a plan section on line indicated by $x^4$—$x^4$, Fig. 1.

Fig. 5 is a view partly in section analogous to Fig. 1, excepting that the parts are shown in the positions they occupy when the cutter blades and guides are retracted.

Fig. 6 is an enlarged sectional detail on line indicated by $x^6$—$x^6$, Fig. 7, the cutter blade being shown in position for making a cut in the drill stem.

Fig. 7 is an enlarged elevation of the portion of the tool adjacent one of the cutter blades, the cover plate and outer plugs of the spring chambers being omitted for clearness of illustration.

Fig. 8 is a fragmentary elevation on line $x^8$—$x^8$, Fig. 2.

Fig. 9 is a perspective view of one of the guides.

Fig. 10 is a perspective view of one of the cutter blades.

The body of the tool is tubular and may be of any suitable construction, and in the instance shown comprises an upper tubular section 1 and an intermediate tubular section 2 connected together by bolts 3. The upper section 1 is screw-threaded onto the outside of the lower end of a hollow operating member 4 in the form of a tube which may be made up of any desired number of sections according to the depth at which the cutting operation is to be performed. The lower end of the intermediate section 2 is screw-threaded onto a lower body section in the form of a hollow bit 5 having teeth 6 in its lower edge. The purpose of the bit 5 is to clean away obstructions that may occur between the drill stem and wall of the well in which the tool is operating. The bit 5 is shouldered at 7 and said shoulder abuts against the lower end of the lower section 2.

The drill stem over which the tool is lowered, and upon which the tool is adapted to operate is indicated at 8 and comprises the usual tube sections joined by couplings, one only of which is indicated at 9. The body section 2 is provided at its upper end with radial slots 10 in which are seated cutter blades 11. There may be any suitable number of these slots and cutter blades 10, 11, and in the instance shown there are three of each. Each cutter blade 10 is provided with a vertically extending wedge shaped groove 12 in its outer face adapted to be engaged by the tapered lower end 13 of an operating wedge 14 which is connected to a lower member 15 of an antifriction bearing, the upper member of said bearing being indicated at 16 and the antifriction elements thereof being indicated at 17. The wedges 14 are accommodated in recesses 18, 19 in the upper and lower body sections 1, 2 respectively, and thus it is clear that upward movement of the body 1, 2 relatively to the wedges 14 will cause inward movement of the cutter blades 11 toward the axis of the body. When the body 1, 2, 5 is lowered from the position shown in Fig. 1 to that shown in Fig. 5 the cutter blades 11 are retracted outwardly by means of springs 20 which are positioned in spring chambers 21. The inner ends of the springs 20 seat against plugs 22 closing the inner ends of the spring chambers, and the outer ends of the springs thrust against studs 23 which project laterally from the side faces of the cutter blades 11. Thus the tendency of the springs 20 is to cause the cutter blades to be retracted when the wedges 14 are so positioned as to allow such retraction to take place. The outer ends of the spring chambers 21 are closed by plugs 24 and the outer ends of the slots 10 are closed by cover plates 25 which may be fastened in place by any suitable means, not shown.

The lower end of the upper body section 1 is provided with radial slots 26 to accommodate shiftable guides 27, the outer ends of said guides being designed to bear against guide moving members 28 which are accommodated in recesses 29, 30 in the body sections 1, 2 respectively. The outer ends of the guides 27 are provided with slanting faces 31 which are adapted to be engaged by the tapered ends 32 of the guide operating members when the guides are moved upward from the position shown in Fig. 5 to that shown in Fig. 1. The guide operating members 28 are fastened to the lower bearing member 15, so that raising of the body 1, 2, 5 relative to the bearing 15, 16 causes the guides 27 to be moved inwardly into juxtaposition to the drill stem 8 as in Fig. 1. After the guides 27 have been moved upward beyond the tapered ends 32 of the guide operating members, said guides are adjacent to vertical faces 33 of the guide moving members and the purpose of these vertical faces is that after the guides 27 have been moved into guiding position further relative movement between the guides and guide moving members may take place without affecting the horizontal positions of the guides while the cutter blades 11 are being forced inwardly by their respective wedges. The guide-operating members 28 are shorter than the wedges 14 so that the tapered ends 32 will come into action to move the guides into guiding position before the cutter blades 11 are moved into engagement with the drill stem being operated on.

The guides 27 are retracted by springs 34 accommodated in spring chambers 35, the inner ends of the springs seating against plugs 36 which close the inner ends of the spring chambers, and the outer ends of said springs thrusting against studs 37 which project downward from the under faces of the guides. The outer ends of the spring chambers 35 are closed by plugs 38 and the outer ends of the slots 26 are closed by cover plates 39 which are fastened in place by any suitable means. The upper bearing member 16 is provided with a tubular upwardly extending portion in the form of a sleeve 40, and fastened to said sleeve by rivets 41 or equivalents, are resilient arms 42 which normally spring inwardly at their free ends so that said ends will not fail to engage beneath one of the coupling members 9 of the drill stem as shown in Fig. 1. These arms 42 readily slip over the couplings when the tool is lowered into the well over the drill stem, and when the tool has been lowered approximately to the point at which the cut is to be made, the tool will be raised sufficiently to bring the arms 42 into engagement with the abutment formed by the lower outstanding edge of that coupling 9 immediately above the arms. Thus it is clear that when further upward movement of the tool is produced, after the arms 42 engage the coupling member, the guide operating members 28 and wedges 14 will be held against inward movement so as to function in the manner described above to force the guides 27 and cutter blades 11 inwardly toward the drill stem.

The upper body section 1 is provided with an internal annular recess 43 to receive a tube 44 which practically fits the bore of the sleeve 40, thus preventing mud and water from working into the bearing 15, 16 and downward into the recesses 18, 29.

The tube 44 constitutes a portion of the body of the tool and forms the inner wall of an annular chamber 44' which houses the bearing members 15, 16. The upper and intermediate body sections 1, 2 are recessed to form vertical spring chambers 45 having springs 45' which seat at their lower ends against the lower ends of the spring chambers and which have their upper ends thrusting against studs 46 that are screw-threaded into the lower bearing member 15. These springs 45' thus tend to hold the bearing 15, 16 and body 1, 2, 5 in the positions entailing retracted positions of the guides 27, guide-operating members 28, wedges 14, and cutter blades 11. This is of advantage during lowering of the tool in the well.

In practice, when it is desired to cut a drill stem into sections and remove said sections one at a time, the tool will be lowered over the drill-stem by means of the pipe 4 to approximately the level at which the stem is to be cut and the parts will then be as shown in Fig. 5, and then the tool will be raised to bring the arms 42 into engagement with the coupling 9, as in Fig. 1. Then the drill stem or the tube 4 will be rotated by any of the usual mechanisms employed for rotating drill stems and the tube 4 will be raised by any suitable means to cause actuation of the guide operating members 28 so as to move the guides from the positions shown in Fig. 5 to those shown in Fig. 1. Then the tube 4 will be raised still farther and during this movement the guides travel along the vertical faces 33 and the cutter blades 11 travel along the tapered ends 13 of the wedges and said cutter blades are thus caused to move inwardly into engagement with the drill stem 8 whereupon said cutter blades will operate to produce a cut, as indicated at *a* Fig. 6. The tube 4 will continue to be raised gradually as the drill stem is rotated so as to cause the cutters to cut deeper and deeper into the drill stem until the cut completely severs one portion of the drill stem from another portion.

After the cutting operation has been completed, the pipe 4 will be withdrawn from the well and with it the body 1, 2 and its parts and since the arms 42 engage the drill stem this withdrawing movement causes the drill stem to be raised at the same time until the upper end is above the top of the well, whereupon the cut-off section of the drill stem will be removed from the well and, if necessary to remove more of the drill stem, the tool will be lowered again so as to make another cut and then raised to raise another section of the drill stem. Thus the cutting operations and raising of the cut-off sections of the drill stem are continued until the well is cleared of the drill stem or as much of it as it is desired to remove.

During the lowering of the tool into position for making a cut, if the lower end of the tool strikes against any obstruction the tool will be rotated so as to cause the teeth 6 thereof to drill through the obstruction.

In so far as I am aware drill stems have not heretofore been removed from wells in this manner and it is understood that changes may be made in the invention without departing from the spirit and scope thereof as expressed in the appended claims.

I claim:

1. A tool of the class described comprising a tubular body, a cutter blade shiftably mounted to move toward and from the axis of said body, means to actuate the cutter blade, resilient means connected with the cutter blade actuating means to engage a drill stem so as to hold the blade actuating means against upward movement, and a tube connected with the body to raise and lower said body.

2. A tool of the class described comprising a tubular body adapted to slip over a pipe, and means including a resilient member engageable with the pipe coupling operative by raising of the tubular body to cut the pipe.

3. A tool of the class described comprising a tubular body adapted to slip over a pipe, means operative by raising of the tubular body to cut the pipe on the relative rotation of the tubular body and the pipe, and teeth on the lower end of the tubular body adapted to cut away any obstruction adjacent the pipe.

4. A tool of the class described comprising a tubular body adapted to slip over a pipe, pipe cutting means associated with the body, upper and lower coöperating bearing members in the body, resilient arms fastened to the upper bearing member, and means fastened to the lower bearing member adapted to move the pipe cutting means into engagement with the pipe to cut the same.

5. A tool of the class described comprising a tubular body adapted to slip over a pipe, pipe cutting means associated with the body, and means operative by raising of the body to move the cutting means into engagement with the pipe, said means including a resilient member engageable with the coupling on the pipe.

6. A tool of the class described comprising a tubular body adapted to slip over a pipe, pipe cutting means associated with the body, and means operative by raising of the body to cause the cutting means to cut the pipe and thereafter operative to raise the cut-off portion of the pipe.

7. A tool of the class described comprising a tubular body adapted to slip over a pipe, cutter blades in the body adapted to move toward and from the axis of the body, wedges to engage the cutter blades to move them inward, and means adapted to engage the pipe to hold the wedges against upward movement.

8. A tool of the class described comprising a tubular body adapted to slip over a pipe, cutter blades in the body adapted to move toward and from the axis of the body, wedges to engage the cutter blades to move them inward, guides in the body adapted to move toward and from the axis of the body, guide operating members having tapered portions to engage the guides to move them inward, and means adapted to engage the pipe to hold the wedges and guide operating members against upward movement.

9. A tool of the class described comprising a tubular body adapted to slip over a pipe, and means operative by raising of the tubular body to guide the pipe in the body and to cut said pipe.

10. A tool of the class described comprising a tubular body adapted to slip over a pipe, means operative by raising of the tubular body to guide the pipe in the body and to cut said pipe, and teeth on the lower end of the tubular body adapted to cut away any obstructions adjacent the pipe.

11. A tool of the class described comprising a tubular body adapted to slip over a pipe having a projecting coupling, pipe cutting blades associated with the body, wedges to engage and move the pipe cutting blades toward the axis of the body, and resilient arms connected with said wedges and adapted to engage beneath the coupling of the pipe to hold the wedges stationary when the tubular body is raised.

12. A tool of the class described comprising resilient arms adapted to engage beneath the coupling of a drill stem, movably mounted cutter blades, and means connected with the arms and operative by upward movement of the blades to cause said blades to move toward the drill stem to cut said stem.

13. A tool of the class described comprising a tubular body adapted to slip over a pipe, and means operative by raising of the tubular body to cut the pipe and thereafter operative to raise the cut-off portion of tne pipe.

14. A tool of the class described comprising a tubular member, pipe-cutting means mounted in the tubular member and operative by raising of the tubular member to cut off a piece of pipe, means mounted on the tubular member and engageable with the cut-off portion of the pipe to hold said cut-off portion, and a tube fastened to the tubular member to raise it from the well.

Signed at Taft, California, this 14th day of January, 1918.

GEORGE KAMMERER.

Witnesses:
   JEAN DEL BONDIO,
   M. A. LOVEY.